United States Patent
Yang et al.

(10) Patent No.: US 8,368,863 B2
(45) Date of Patent: Feb. 5, 2013

(54) LIQUID CRYSTAL DISPLAY PANEL

(75) Inventors: Wei-Chieh Yang, Taipei (TW); Wen-Yi Hsu, Taoyuan County (TW); Wei-Yi Chien, Keelung (TW); Mei-Lien Huang, Hsinchu County (TW); Wei-Chen Tsai, Taipei County (TW); Yu-Chen Liu, Hsinchu (TW); Chih-Hsiao Tseng, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 199 days.

(21) Appl. No.: 12/907,037

(22) Filed: Oct. 19, 2010

(65) Prior Publication Data

US 2012/0026449 A1  Feb. 2, 2012

(30) Foreign Application Priority Data

Jul. 29, 2010 (TW) .................. 99125132 A

(51) Int. Cl.
*G02F 1/1339* (2006.01)
*G02F 1/1333* (2006.01)
(52) U.S. Cl. ......... 349/153; 349/110; 349/111; 349/190
(58) Field of Classification Search .................. 349/153, 349/110–111, 190
See application file for complete search history.

(56) References Cited

U.S. PATENT DOCUMENTS

| 6,628,365 | B1 | 9/2003 | Park et al. | |
| 7,728,946 | B2 * | 6/2010 | Tsai et al. | 349/153 |
| 7,965,371 | B2 | 6/2011 | Tasaka | |
| 2002/0047963 | A1 | 4/2002 | Youn et al. | |
| 2004/0075801 | A1 | 4/2004 | Choi et al. | |
| 2005/0094062 | A1 * | 5/2005 | Cheng et al. | 349/110 |
| 2007/0273821 | A1 * | 11/2007 | Liou et al. | 349/153 |
| 2008/0180628 | A1 | 7/2008 | Tasaka | |

FOREIGN PATENT DOCUMENTS

| CN | 101236322 A | 8/2008 |
| JP | 2008-107488 | 5/2008 |

OTHER PUBLICATIONS

"Second Office Action of China Counterpart Application", issued on Mar. 9, 2012, p. 1-p. 4, in which the listed reference was cited.
"First Office Action of China Counterpart Application", issued on Apr. 28, 2011, p. 1-p. 3, in which the listed references were cited.

* cited by examiner

*Primary Examiner* — Bumsuk Won
*Assistant Examiner* — Charles Chang
(74) *Attorney, Agent, or Firm* — Jianq Chyun IP Office

(57) ABSTRACT

A liquid crystal display (LCD) panel including a first substrate, a second substrate, a liquid crystal layer, a photo-curable sealant, and a first light-shielding pattern is provided. The liquid crystal layer is disposed between the first substrate and the second substrate. The photo-curable sealant is disposed between the first substrate and the second substrate, wherein the photo-curable sealant surrounds and is in contact with the liquid crystal layer. The first light-shielding pattern is disposed on the first substrate, wherein a portion of the sidewall of the first light-shielding pattern is substantially aligned with a portion of the sidewall of the first substrate, and the first light-shielding pattern is only overlapped with an outer edge of the photo-curable sealant or is not overlapped with the photo-curable sealant.

22 Claims, 7 Drawing Sheets

LIQUID CRYSTAL DISPLAY PANEL

CROSS-REFERENCE TO RELATED APPLICATION

This application claims the priority benefit of Taiwan application serial no. 99125132, filed on Jul. 29, 2010. The entirety of the above-mentioned patent application is hereby incorporated by reference herein and made a part of this specification.

BACKGROUND OF THE INVENTION

1. Field of the Invention

The present invention generally relates to a display panel, and more particularly, to a liquid crystal display (LCD) panel.

2. Description of Related Art

Along with the development of display technologies, our daily life has been made more convenient with the help of various displays. With the demand to light-weighted and slim displays, flat panel display (FPD) has become mainstream display. Among all FPDs, liquid crystal display (LCD) is the most popular one thanks to its many advantages such as high space efficiency, low power consumption, zero radiation, and low electromagnetic interference.

In order to manufacture LCDs in bulk quantities, a glass substrate used for manufacturing LCD panels usually comes in a size that is several times of that of a LCD panel before the glass substrate is cut. Generally speaking, the manufacturing process of a LCD includes the manufacturing of a thin film transistor (TFT) array substrate, the manufacturing of a color filter substrate, sealant dispensing, substrates bonding, liquid crystal filling, scribing, splitting, driver IC bonding, and backlight assembly, etc. The LCD panel is roughly completed after the scribing and splitting processes are performed.

In recent years, in order to reduce the area occupied by peripheral circuits, LCD panel tends to be designed with ultra slim border. However, the ultra slim border area limits the layout space for sealant dispensing, and accordingly, the sealant dispensing process has become one of the bottlenecks in the manufacturing process of LCD panels. The sealant width and position accuracy may be changed during the sealant dispensing process, and the ultra slim border design may cause the sealant to shift onto the scribe lines or overflow to the scribe lines after the two opposite substrates of the LCD panels are bonded together. During the scribing and splitting process after the sealant is cured, because the cured sealant is formed on the scribe lines, it is difficult to control the scribing accuracy, and besides, the LCD panels may not be successfully broken during the splitting process or unsatisfactory scribing sections (for example, concave-convex angles) may be formed. Thus, uneven sections may be obtained at the sides of the LCD panels. As a result, process accuracy and the yield of subsequent process may be affected. Accordingly, how to realize the ultra slim border design and resolve aforementioned problem of unsatisfactory scribing to ensure a high production yield has become one of the major subjects in the manufacturing of LCD panels.

SUMMARY OF THE INVENTION

Accordingly, the present invention is directed to a liquid crystal display (LCD) panel, wherein the LCD panel is successfully separated after the scribing and splitting process by disposing a light-shielding pattern, so that a design with ultra slim border can be realized in the LCD panel.

The present invention provides a LCD panel including a first substrate, a second substrate, a liquid crystal layer, a photo-curable sealant, and a first light-shielding pattern. The liquid crystal layer is disposed between the first substrate and the second substrate. The photo-curable sealant is disposed between the first substrate and the second substrate, wherein the photo-curable sealant surrounds and is in contact with the liquid crystal layer. The first light-shielding pattern is disposed on the first substrate, wherein a portion of the sidewall of the first light-shielding pattern is substantially aligned with a portion of the sidewall of the first substrate, and the first light-shielding pattern is only overlapped with an outer edge of the photo-curable sealant or is not overlapped with the photo-curable sealant.

According to an embodiment of the present invention, the first substrate is an active device array substrate, and the second substrate is an opposite substrate.

According to an embodiment of the present invention, the first substrate is an opposite substrate, and the second substrate is an active device array substrate.

According to an embodiment of the present invention, when the first light-shielding pattern is only overlapped with the outer edge of the photo-curable sealant, a portion of the sidewall of the photo-curable sealant is substantially aligned with a portion of the sidewall of the first substrate.

According to an embodiment of the present invention, when the first light-shielding pattern is only overlapped with the outer edge of the photo-curable sealant, a portion of the sidewall of the photo-curable sealant is kept at a distance away from a portion of the sidewall of the first substrate.

According to an embodiment of the present invention, when the first light-shielding pattern is not overlapped with the photo-curable sealant, a portion of the sidewall of the photo-curable sealant is kept at a distance away from a portion of the sidewall of the first substrate.

According to an embodiment of the present invention, the material of the first light-shielding pattern includes metal or light-shielding resin.

According to an embodiment of the present invention, the first light-shielding pattern includes two separate strip-shaped light-shielding patterns, and the strip-shaped light-shielding patterns are distributed along two longer sides of the first substrate.

According to an embodiment of the present invention, the first light-shielding pattern includes three strip-shaped light-shielding patterns, and the strip-shaped light-shielding patterns are distributed along two longer sides and one shorter side of the first substrate. The strip-shaped light-shielding patterns may be separated from or connected with each other.

According to an embodiment of the present invention, the first light-shielding pattern includes a plurality of L-shaped light-shielding patterns, and the L-shaped light-shielding patterns are distributed corresponding to a part of the corners of the first substrate.

According to an embodiment of the present invention, the width of the first light-shielding pattern is smaller than the width of the photo-curable sealant.

According to an embodiment of the present invention, the LCD panel further includes a second light-shielding pattern disposed on the second substrate, wherein the second light-shielding pattern is only overlapped with an outer edge of the photo-curable sealant or is not overlapped with the photo-curable sealant.

According to an embodiment of the present invention, when the second light-shielding pattern is only overlapped with the outer edge of the photo-curable sealant, a portion of the sidewall of the photo-curable sealant is substantially aligned with a portion of the sidewall of the second substrate.

According to an embodiment of the present invention, when the second light-shielding pattern is only overlapped with the outer edge of the photo-curable sealant, a portion of the sidewall of the photo-curable sealant is kept at a distance away from a portion of the sidewall of the second substrate.

According to an embodiment of the present invention, when the second light-shielding pattern is not overlapped with the photo-curable sealant, a portion of the sidewall of the photo-curable sealant is kept at a distance away from a portion of the sidewall of the second substrate.

According to an embodiment of the present invention, the material of the second light-shielding pattern includes metal or light-shielding resin.

According to an embodiment of the present invention, the second light-shielding pattern includes two separate strip-shaped light-shielding patterns, and the strip-shaped light-shielding patterns are distributed along two longer sides of the second substrate.

According to an embodiment of the present invention, the second light-shielding pattern includes three strip-shaped light-shielding patterns, and the strip-shaped light-shielding patterns are distributed along two longer sides and one shorter side of the second substrate. The strip-shaped light-shielding patterns may be separated from or connected with each other.

According to an embodiment of the present invention, the second light-shielding pattern includes a plurality of L-shaped light-shielding patterns, and the L-shaped light-shielding patterns are distributed corresponding to a part of the corners of the second substrate.

According to an embodiment of the present invention, the width of the second light-shielding pattern is smaller than the width of the photo-curable sealant.

As described above, in a LCD panel provided by the present invention, a first light-shielding pattern is disposed on a first substrate, and a portion of the sidewall of the first light-shielding pattern is substantially aligned with a portion of the sidewall of the first substrate. Even if the sealant dispensing area is shifted or the sealant overflows onto the scribe lines due to the ultra slim borders of the LCD panel, the sealant cannot be fully cured because the first light-shielding pattern blocks a part of the light. Thus, each LCD panel can be successfully separated during the scribing and splitting process so that the problem of unsatisfactory sections is resolved and the production yield is improved. Accordingly, in the LCD panel provided by the present invention, the problem of the photo-curable sealant shifting or overflowing onto the scribe lines caused by the ultra slim border design can be effectively resolved, so that the ultra slim border design can be successfully realized.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
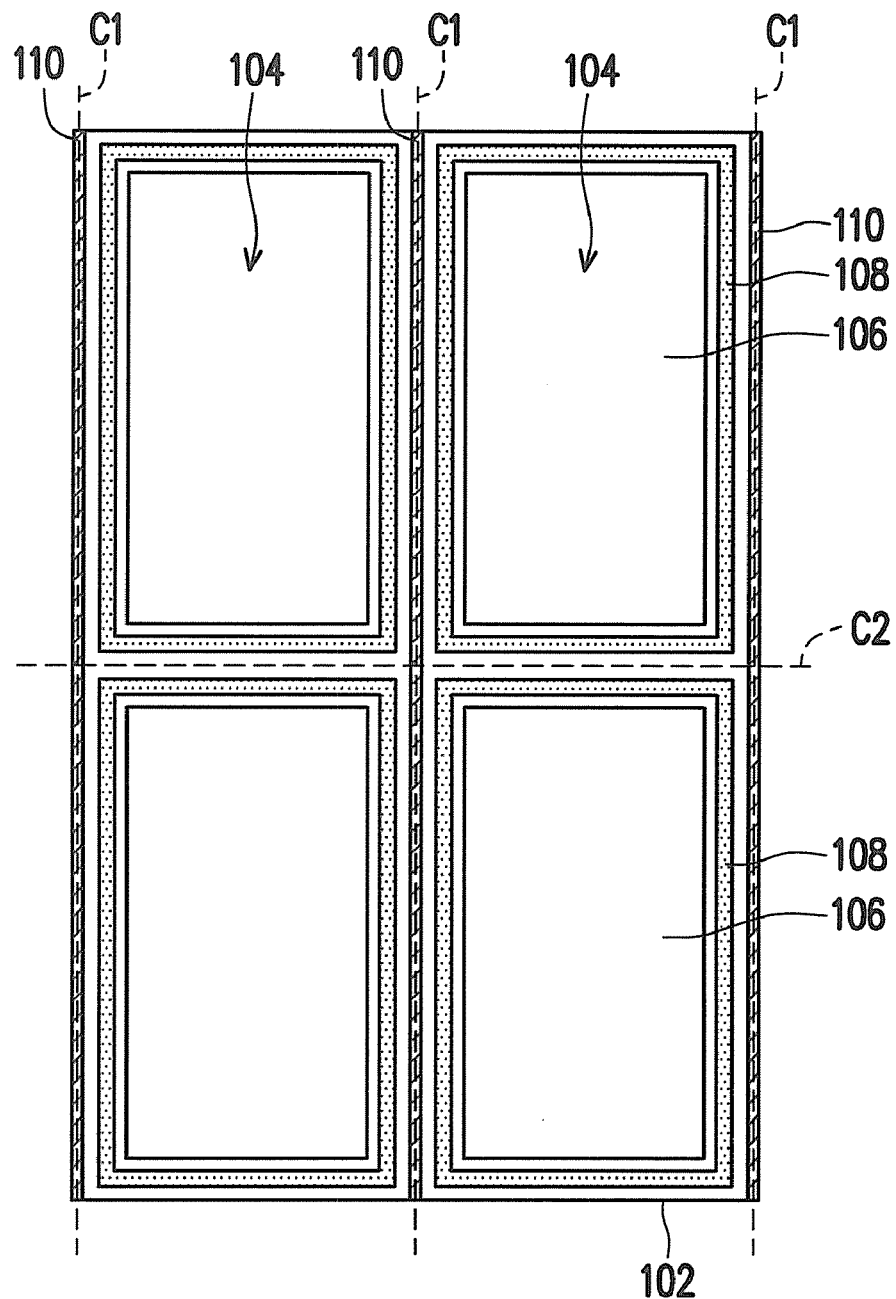
FIG. 1 is a top view of a glass sheet according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Generally speaking, a liquid crystal display (LCD) panel is composed of two substrates and a liquid crystal layer disposed between the two substrates. In order to effectively manufacture a large number of LCD panels in consideration of mass production efficiency, first, the LCD panels are respectively formed on two large glass sheets, wherein each of the LCD panels may include essential devices such as an active device array, a color filter pattern, and a black matrix. Then, the two glass sheets are bonded together and a liquid crystal layer is injected in between to complete the fabrication of the LCD panels. After that, the bonded glass sheets are cut into a plurality of independent LCD panels (or referred to as LCD units) through a scribing and splitting process.

FIG. 1 is a top view of a glass sheet according to an embodiment of the present invention. In the present embodiments, the positions of scribe lines, light-shielding patterns, and photo-curable sealant on a single glass sheet are illustrated in FIG. 1 for the convenience of description. However, the present invention is not limited thereto.

Referring to FIG. 1, the glass sheet 102 is divided into a plurality of areas for fabricating a plurality of LCD panels 104. Thus, the bonded glass sheets will be scribed along a plurality of scribe lines C1 and a plurality of scribe lines C2 by using a scriber (for example, a cutting wheel or a laser beam) to separate the LCD panels 104, wherein the scribe lines C1 and C2 are respectively aligned with the edges of the LCD panels 104. In other words, the scribe lines C1 and C2 are corresponding to the sidewalls of the separated LCD panels 104. For example, a plurality of device layers 106 is disposed on the glass sheet 102, and a photo-curable sealing material 108 is dispensed around the edges of the device layers 106. A light-shielding pattern material 110 may be extended along the scribe lines C1 and disposed at the intersections between the longer sides of adjacent LCD panels. The light-shielding pattern material 110 may be a metal or light-shielding resin, and the material of the light-shielding pattern material 110 is determined according to the disposed position thereof.

After the glass sheet 102 and another glass sheet (not shown) are bonded together by using the photo-curable sealing material 108, an illumination process is performed to cure the photo-curable sealing material 108, and a liquid crystal layer (not shown) is filled in the range surrounded by the photo-curable sealing material 108.

Because the light-shielding pattern material 110 is disposed on the scribe lines C1 corresponding to the longer sides of the LCD panels 104 and which can block part of the light, even though the photo-curable sealing material 108 is dispensed over or overflows onto the scribe lines, the photo-curable sealing material 108 on the scribe lines C1 won't be fully cured after the illumination process. Accordingly, when subsequently the bonded glass sheets are cut along the scribe lines C1 and C2 by using a cutting wheel or a laser beam to form a plurality of LCD panels 104, since the photo-curable sealing material 108 on the scribe lines C1 is not fully cured, the LCD panels 104 can be successfully separated. Thus, the problem of unsatisfactory sections is resolved and the production yield is improved. After the scribing and splitting process, the photo-curable sealing material that is disposed corresponding to the light-shielding pattern material 110 and is not fully cured self-cures due to the volatilization of the solvent in the photo-curable sealing material to form the photo-curable sealant. In addition, after performing the scribing and splitting process along the scribe lines C1 and C2, a portion of the sidewall of the light-shielding pattern on the longer side (corresponding to the scribe lines C1 in FIG. 1) of each obtained LCD panel 104 is substantially aligned with a portion of the sidewall of the substrate.

Next, a single LCD panel obtained by scribing the glass sheets will be described according to an embodiment of the present invention with reference to a top view and a cross-sectional view of the LCP panel. It should be noted that the layout of the light-shielding pattern in an actual application of the LCD panel provided the present invention will be described in detail in the present embodiment so that those skilled in the art can implement the present invention according to the present disclosure. However, the present embodiment is not intended to limit the scope of the present invention. The positions of other components can be implemented based on the knowledge of those having ordinary skilled in the art and are not limited to following description of the present embodiment.

Figure 2:
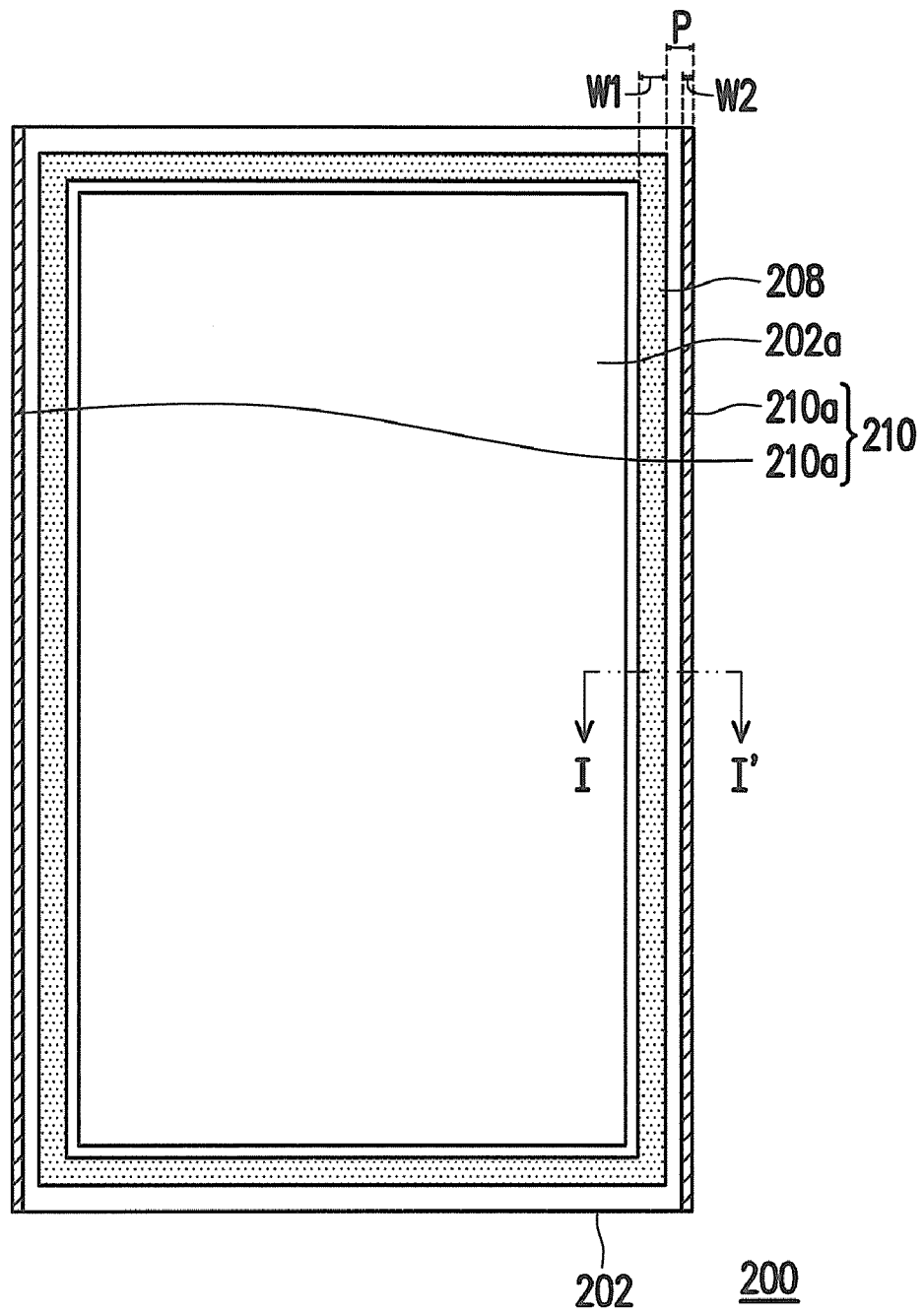
FIG. 2 is a top view of a liquid crystal display (LCD) panel according to a first embodiment of the present invention.
Figure 3A:
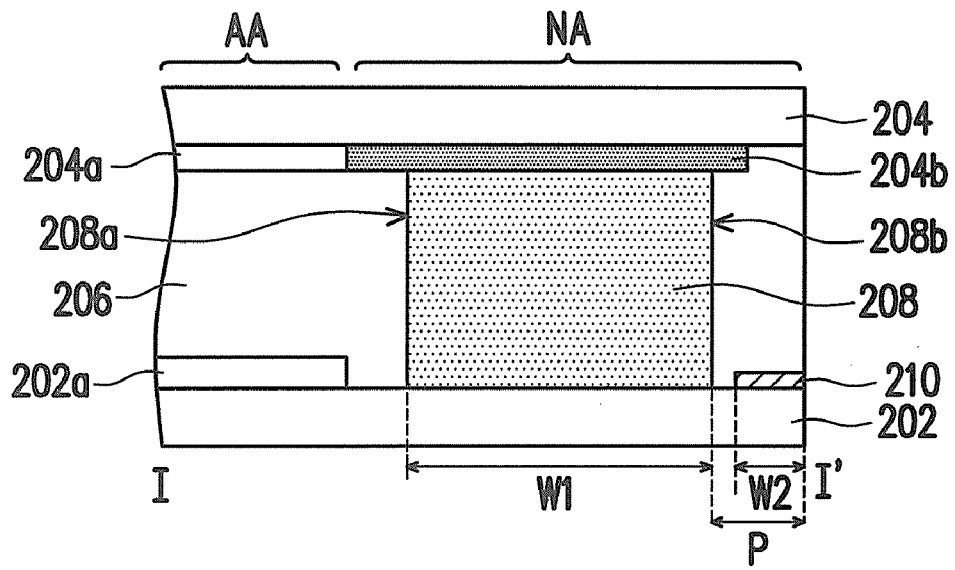
FIG. 3A is a cross-sectional view of the LCD panel in FIG. 2 along line I-I'.

FIG. 2 is a top view of a liquid crystal display (LCD) panel according to a first embodiment of the present invention. FIG. 3A is a cross-sectional view of the LCD panel in FIG. 2 along line I-I'. For the convenience of description, the positions of only a first light-shielding pattern and a photo-curable sealant on a first substrate are illustrate in FIG. 2.

Referring to both FIG. 2 and FIG. 3A, the LCD panel 200 has a display area AA and a peripheral area NA surrounding the display area AA. The LCD panel 200 includes a first substrate 202, a second substrate 204, a liquid crystal layer 206, a photo-curable sealant 208, and a first light-shielding pattern 210. The first substrate 202 and the second substrate 204 may be made of a rigid material (for example, glass) or other non-rigid materials. The first substrate 202 may be an active device array substrate, and the second substrate 204 may be an opposite substrate, wherein the second substrate 204 is disposed above the first substrate 202. The liquid crystal layer 206 is disposed between the first substrate 202 and the second substrate 204.

To be specific, an active device array layer 202a is formed on the first substrate 202 (i.e., an active device array substrate) in the display area AA. The active device array layer 202a has sub pixel regions that are arranged as an array. Each of the sub pixel regions includes an active device, a pixel electrode, a scan line, and a data line, and at least three sub pixel regions form a pixel region, wherein the active devices may be thin film transistors (TFTs). The second substrate 204 (i.e., the opposite substrate) may be a color filter substrate, and a plurality of color filter patterns 204a and a black matrix 204b are disposed on the second substrate 204. In the display area AA, the black matrix 204b may be disposed between the color filter patterns 204a. Besides, a common electrode layer (not shown) may be further disposed on the second substrate 204. The common electrode layer is disposed within the display area AA and between the color filter patterns 204a, the black matrix 204b, and the liquid crystal layer 206. Accordingly, the arrangement of the liquid crystal molecules in the liquid crystal layer 206 is controlled by the electric field between the common electrode layer of the second substrate 204 and the pixel electrode of the first substrate 202.

For the convenience of description, the structural details of the active device array layer 202a, the color filter patterns 204a, the black matrix 204b, and the common electrode layer are omitted in FIG. 2 and FIG. 3A. However, the actual positions and functions of the omitted component should be understood by those having ordinary skilled in the art therefore will not be described herein. Besides, foregoing situation is only an example but not intended to limit the present invention. The first substrate 202 may also be a color filter on array (COA) substrate wherein the color filter pattern is directly integrated with the active device layer. In this case, the color filter pattern on the second substrate 204 can be omitted.

The photo-curable sealant 208 is disposed between the first substrate 202 and the second substrate 204, wherein the photo-curable sealant 208 surrounds and is in contact with the liquid crystal layer 206. In other words, the photo-curable sealant 208 is disposed in the peripheral area NA to bond the first substrate 202 and the second substrate 204 together and kept a fixed cell-gap between the two substrates, and to define a space for containing the liquid crystal layer 206 and sealing the liquid crystal molecules. Accordingly the photo-curable sealant 208 surrounding the liquid crystal layer 206 has an inner edge 208a and an outer edge 208b, wherein the inner edge 208a of the photo-curable sealant 208 is the side that is close to the display area AA and is in contact with the liquid crystal layer 206, and the outer edge 208b thereof is the side that is close to edges of the sidewalls of the first substrate 202 and the second substrate 204 and is not in contact with the liquid crystal layer 206.

The first light-shielding pattern 210 is disposed on the first substrate 202 within the peripheral area NA, and the first light-shielding pattern 210 may be made of a metal. As shown in FIG. 2, the first light-shielding pattern 210 includes two separate strip-shaped light-shielding patterns 210a. The strip-shaped light-shielding patterns 210a may be distributed along two longer sides of the first substrate 202. Preferably, the sidewall at the outer edge of the first light-shielding pattern 210 is substantially aligned with a portion of the sidewall of the first substrate 202 and no space is kept in between. Namely, the sidewall at the outer edge of the first light-shielding pattern 210 is substantially aligned with the sidewall of the first substrate 202 at the longer sides and no space is kept in between. The width W2 of the first light-shielding pattern 210 is smaller than the width W1 of the photo-curable sealant 208, wherein the width W2 of the first light-shielding pattern 210 may be substantially smaller than or equal to 25 μm. In the first embodiment, the first light-shielding pattern 210 is not overlapped with the photo-curable sealant 208. When the first light-shielding pattern 210 is not overlapped with the photo-curable sealant 208, the sidewall at the outer edge 208b of the photo-curable sealant 208 is kept at a distance P away from a portion of the sidewall of the first substrate 202, wherein the distance P is greater than the width W2 of the first light-shielding pattern 210. Besides, the distance P between the sidewall at the outer edge 208b of the photo-curable sealant 208 and the sidewall of the first substrate 202 may be substantially smaller than or equal to 150 μm.

It should be mentioned herein that because the LCD panel 200 is fabricated by dispensing a photo-curable sealing material around the outer edge of the display area AA on a large piece of glass sheet to bond two glass sheets and form a plurality of LCD panels, the bonded glass sheets have to be cut into a plurality of LCD panels before subsequent process is performed. Since a light-shielding pattern material is disposed on the connective longer sides between adjacent LCD panels on the glass sheet and extended along the scribe lines, after dividing the glass sheets along the scribe lines to form a plurality of predetermined LCD panels, the light-shielding pattern material on the glass sheet is also divided along the scribe lines (as shown in FIG. 1). Accordingly, in each LCD panel 200 formed by scribing along the scribe lines, a portion of the sidewall of the first light-shielding pattern 210 is substantially aligned with a portion of the sidewall of the first substrate 202, as shown in FIG. 3A.

Figure 3B:
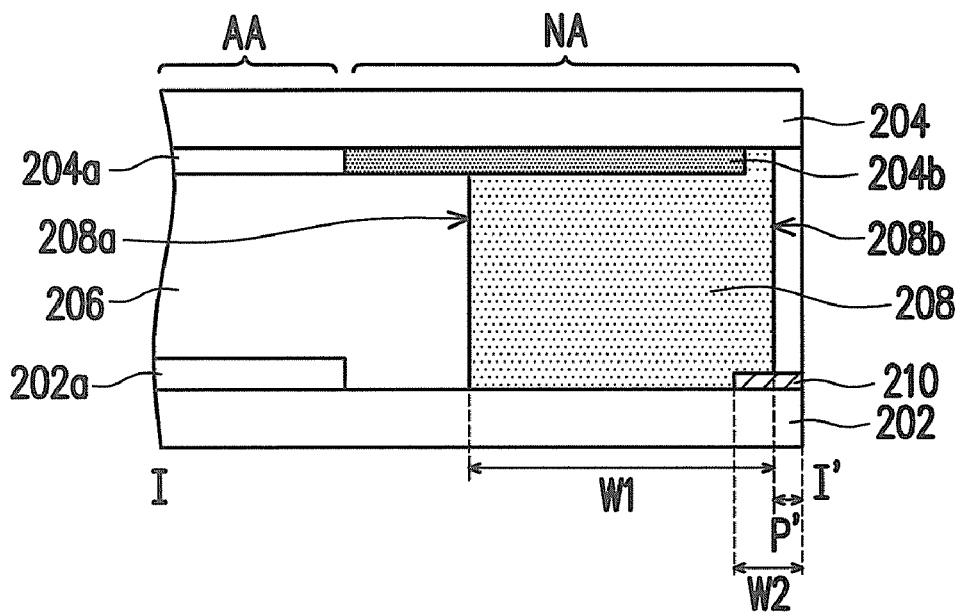
FIG. 3B is a cross-sectional view of a LCD panel according to a second embodiment of the present invention.
Figure 3C:
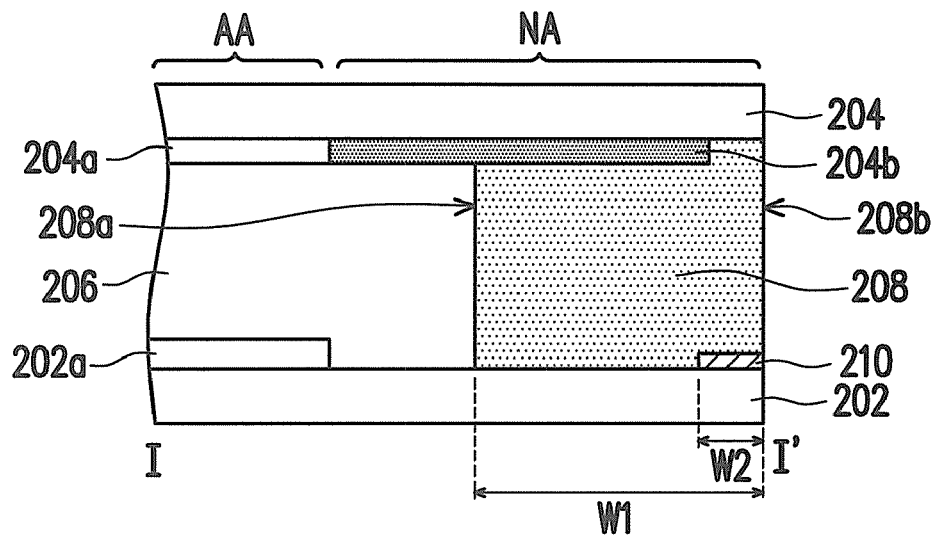
FIG. 3C is a cross-sectional view of a LCD panel according to a third embodiment of the present invention.

FIG. 3B is a cross-sectional view of a LCD panel according to a second embodiment of the present invention. FIG. 3C is a cross-sectional view of a LCD panel according to a third embodiment of the present invention. It should be noted that the components in FIG. 3B and FIG. 3C that are the same as those in FIG. 3A are indicated by the same reference numerals and will not be described herein.

Referring to FIG. 3B and FIG. 3C, in another embodiment, the components constituting the LCD panel illustrated in FIG. 3B and FIG. 3C are similar to those constituting the LCD panel illustrated in FIG. 3A. However, the two LCD panels differ in the relative position between the first light-shielding pattern and the photo-curable sealant. In the LCD panel illustrated in FIG. 3B and FIG. 3C, the first light-shielding pattern 210 is only overlapped with the outer edge 208b of the photo-curable sealant 208.

In the second embodiment, as shown in FIG. 3B, when the first light-shielding pattern 210 is only overlapped with the outer edge 208b of the photo-curable sealant 208, the sidewall at the outer edge 208b of the photo-curable sealant 208 is kept at a distance P' away from a portion of the sidewall of the first substrate 202, wherein the distance P' is substantially smaller than the width W2 of the first light-shielding pattern 210.

In the third embodiment, as shown in FIG. 3C, when the first light-shielding pattern 210 is only overlapped with the outer edge 208b of the photo-curable sealant 208, the sidewall at the outer edge 208b of the photo-curable sealant 208 is substantially aligned with a portion of the sidewall of the first substrate 202 and no space is kept in between. Namely, the sidewall at the outer edge 208b of the photo-curable sealant 208 is substantially aligned with the sidewall along the longer side of the first substrate 202 and no space is kept in between.

It should be mentioned that after dispensing the photo-curable sealing material around the outer edge of the display area AA, an illumination process is performed according to the characteristic of the photo-curable sealing material to cure the photo-curable sealing material, so as to bond two glass sheets together. When light is radiated on the photo-curable sealing material from outside of the first substrate 202 (i.e., from under the first substrate 202, as illustrated in FIG. 3A and FIG. 3B), because the first light-shielding pattern 210 disposed on the first substrate 202 blocks light, the photo-curable sealing material above the first light-shielding pattern 210 is not fully cured. Namely, even though the photo-curable sealing material is directly dispensed over the scribe lines or the photo-curable sealing material dispensed around the scribe lines overflows onto the scribe lines when the glass sheets are bonded, the first light-shielding pattern 210 partially blocks the light so that the photo-curable sealing material on the scribe lines is not fully cured after the illumination process. Accordingly, when subsequently the bonded glass sheets are cut along the scribe lines to form a plurality of LCD panels, the LCD panels can be successfully separated during the scribing and splitting process. Moreover, the obtained LCD panels have even sections so that the problem of unseparatable LCD panels or concave-convex angels at the sections is resolved. Accordingly, the production yield is improved. Thereby, by disposing the first light-shielding pattern, the problem of the photo-curable sealing material shifting or overflowing onto the scribe lines caused by the ultra slim border design is effectively resolved, and the LCD panel can be designed with ultra slim borders.

Figure 4:
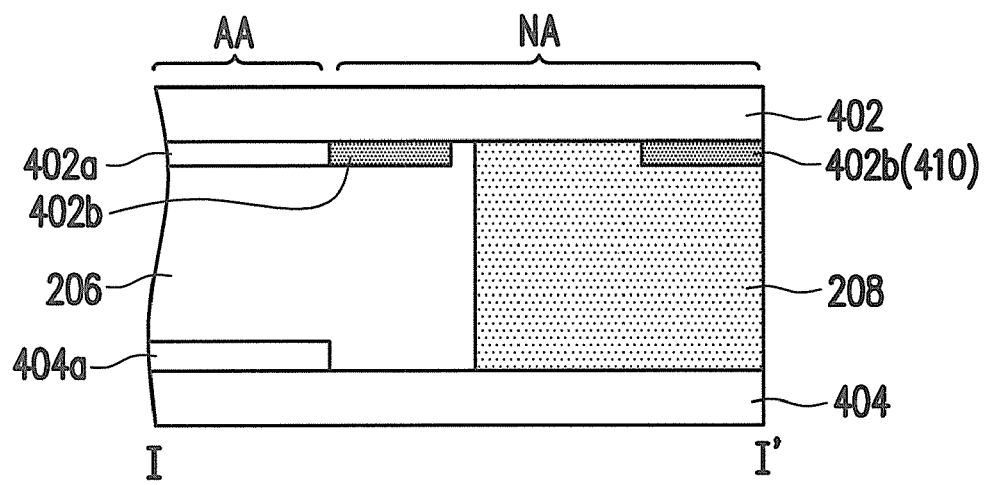
FIG. 4 is a cross-sectional view of a LCD panel according to a fourth embodiment of the present invention.

FIG. 4 is a cross-sectional view of a LCD panel according to a fourth embodiment of the present invention. It should be noted that the components in FIG. 4 that are the same as those in FIG. 3A are indicated with the same reference numerals and will not be described herein.

Referring to FIG. 4, in the fourth embodiment, the components for constituting the LCD panel in FIG. 4 are similar to those for constituting the LCD panel in FIG. 3A. However, the two LCD panels differ in the types of the first substrate and the second substrate.

In the LCD panel illustrated in FIG. 3A, the first substrate 202 disposed with a first light-shielding pattern 210 is an active device array substrate, and the second substrate 204 is an opposite substrate. However, in the LCD panel illustrated in FIG. 4, the first substrate 402 is an opposite substrate, and the second substrate 404 is an active device array substrate. Similarly, the first substrate 402 (i.e., the opposite substrate) may be a color filter substrate, and a plurality of color filter patterns 402a and a black matrix 402b is disposed on the color filter substrate. An active device array layer 404a is formed on the second substrate 404 (i.e., the active device array substrate). In the present embodiment, the black matrix 402b in the peripheral area NA is served as a first light-shielding pattern 410, wherein a portion of the sidewall of the black matrix 402b is substantially aligned with a portion of the sidewall of the first substrate 402. In other words, the first light-shielding pattern 410 disposed on the first substrate 402 may be made of light-shielding resin. When light is radiated from outside of the first substrate 402 (i.e., from above the first substrate 402, as illustrated in FIG. 4) onto the photo-curable sealing material during an illumination process, since the first light-shielding pattern 410 disposed on the first substrate 402 blocks the light partially, the photo-curable sealing material below the first light-shielding pattern 410 is not fully cured. Accordingly, the LCD panels can be successfully separated in subsequent scribing and splitting process.

Additionally, the embodiment illustrated in FIG. 4 is described by assuming that the first light-shielding pattern 410 is only overlapped with the outer edge 208b of the photo-curable sealant 208 and the sidewall at the outer edge 208b of the photo-curable sealant 208 is substantially aligned with a portion of the sidewall of the first substrate 402. However, the present invention is not limited thereto, and in another embodiment, the first light-shielding pattern 410 may be overlapped only with the outer edge 208b of the photo-curable sealant 208 or not overlapped with the photo-curable sealant 208, and the sidewall at the outer edge 208b of the photo-curable sealant 208 may be kept at a distance away from a portion of the sidewall of the first substrate 202. Those having ordinary skilled in the art can adjust foregoing factors according to the embodiments described above and the actual requirement.

Figure 5A:
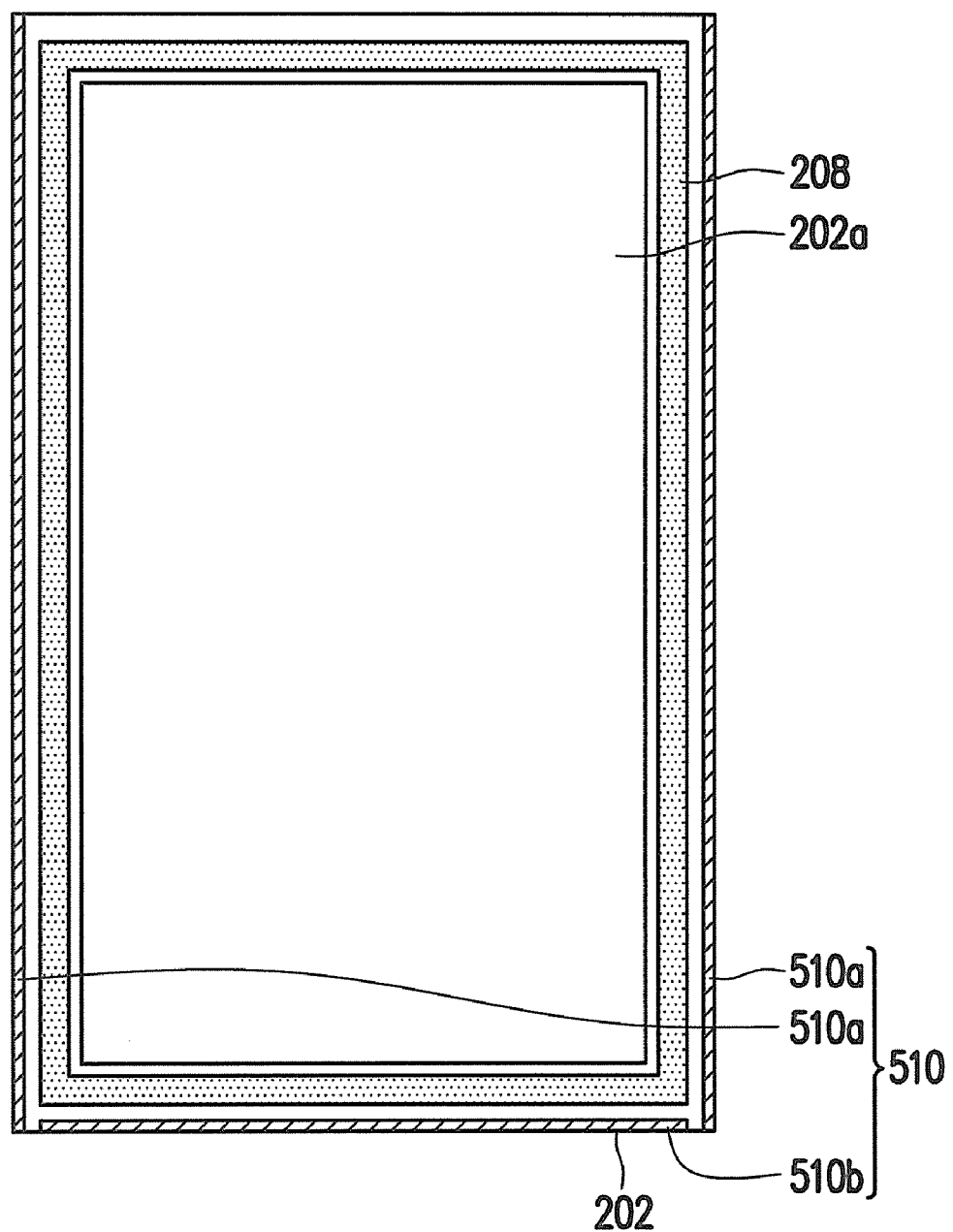
FIG. 5A and FIG. 5B are top views of a LCD panel according to a fifth embodiment of the present invention.
Figure 5B:
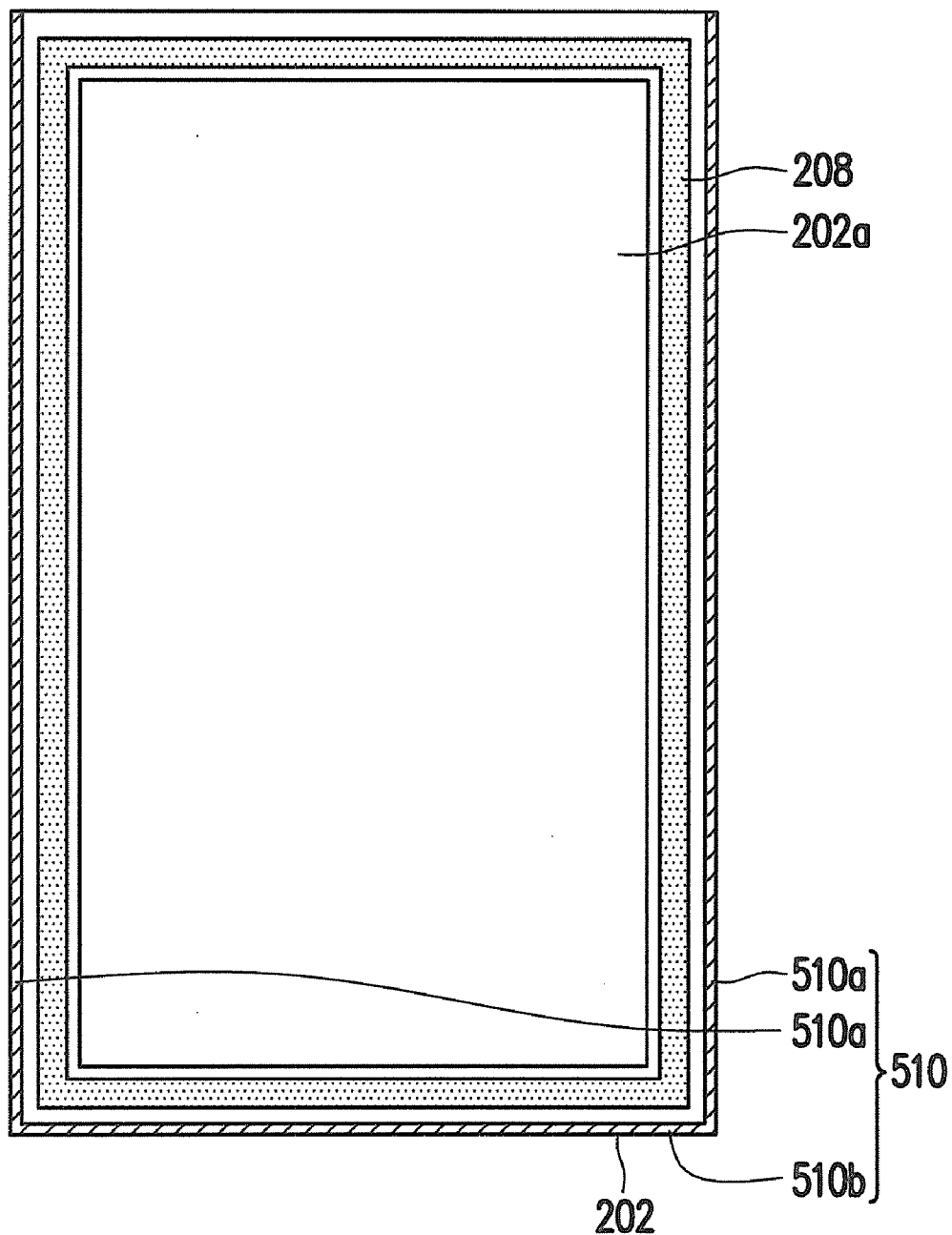
Figure 6:
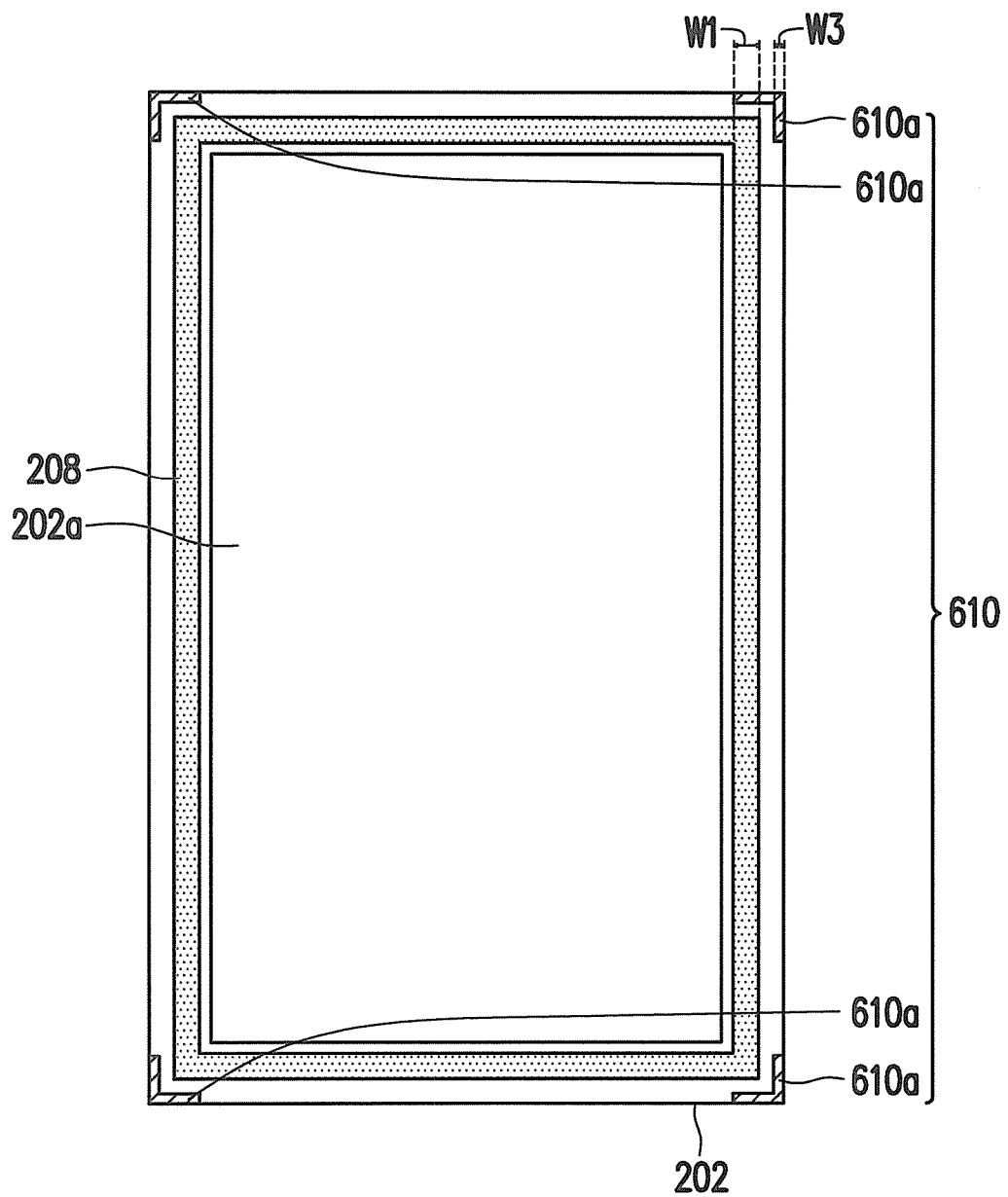
FIG. 6 is a top view of a LCD panel according to a sixth embodiment of the present invention.

FIG. 5A and FIG. 5B are top views of a LCD panel according to a fifth embodiment of the present invention. FIG. 6 is a top view of a LCD panel according to a sixth embodiment of the present invention. It should be noted that the components in FIG. 5A, FIG. 5B, and FIG. 6 that are the same as those in FIG. 2 are indicated with the same reference numerals and will not be described herein.

Referring to FIG. 5A and FIG. 5B, in the fifth embodiment, the components for constituting the LCD panel in FIG. 5A and FIG. 5B are similar to those for constituting the LCD panel in FIG. 2. However, the two LCD panels differ in the position of the first light-shielding pattern. In FIG. 2, the first light-shielding pattern 210 is composed of two separate strip-shaped light-shielding patterns 210a which are distributed along two longer sides of the first substrate 202. In the present embodiment, the first light-shielding pattern 510 in the present embodiment includes three strip-shaped light-shielding patterns 510a and 510b. The strip-shaped light-shielding patterns 510a are distributed along two longer sides of the first substrate 202, and the strip-shaped light-shielding pattern 510b is distributed along one shorter side of the first substrate 202. The strip-shaped light-shielding patterns 510a and 510b may be separated from each other (as shown in FIG. 5A) or connected with each other (as shown in FIG. 5B).

Referring to FIG. 6, in the sixth embodiment, the components for constituting the LCD panel are similar to those for constituting the LCD panel in FIG. 2. However, the two LCD panels differ in the position of the first light-shielding pattern. In the present embodiment, the first light-shielding pattern 610 includes a plurality of L-shaped light-shielding patterns 610a, and these L-shaped light-shielding patterns 610a are distributed corresponding to some corners of the first substrate 202. Accordingly, a portion of the sidewall of the first light-shielding pattern 610 is substantially aligned with a portion of the sidewall of the first substrate 202. In an embodiment, the width W3 of the L-shaped light-shielding patterns 610a is substantially smaller than or equal to the width W1 of the photo-curable sealant 208, wherein the width W3 of the L-shaped light-shielding patterns 610a may be substantially smaller than or equal to 25 µm.

Generally speaking, the sealant width or position accuracy may also be changed at corners when the photo-curable sealing material is dispensed, or the photo-curable sealing material may overflow after the two glass sheets are bonded together, which may cause improper cuttings. Because the L-shaped light-shielding patterns 610a are respectively disposed at the four corners of the first substrate 202, even though the accuracy of the photo-curable sealing material changes or the photo-curable sealing material overflows onto the scribe lines after the glass sheets are bonded together, the photo-curable sealing material on the scribe lines at the corners is not fully cured through the position of the L-shaped light-shielding patterns 610a. Thus, the LCD panels can be successfully separated after the scribing and splitting process, and the problem of unsatisfactory sections is resolved.

It should be mentioned that foregoing embodiment is described by assuming that the first light-shielding pattern is disposed on the first substrate. However, the present invention is not limited thereto. In another embodiment, the LCD panel further includes a second light-shielding pattern disposed on the second substrate. With the similar disposed position and size of the first light-shielding pattern, the second light-shielding pattern may be only overlapped with the outer edge of the photo-curable sealant or not overlapped with the photo-curable sealant. When the second light-shielding pattern is only overlapped with the outer edge of the photo-curable sealant, a portion of the sidewall of the photo-curable sealant may be substantially aligned with or kept at a distance away from a portion of the sidewall of the second substrate. When the second light-shielding pattern is not overlapped with the photo-curable sealant, a portion of the sidewall of the photo-curable sealant is kept at a distance away from a portion of the sidewall of the second substrate.

The second light-shielding pattern may be made of metal or light-shielding resin according to the type of the second substrate. To be specific, if the first substrate is an active device array substrate and the second substrate is an opposite substrate, the first light-shielding pattern disposed on the first substrate is made of metal, and the second light-shielding pattern disposed on the second substrate is made of light-shielding resin. Contrarily, if the first substrate is an opposite substrate and the second substrate is an active device array substrate, the first light-shielding pattern disposed on the first substrate is made of light-shielding resin, and the second light-shielding pattern disposed on the second substrate is made of metal.

Moreover, the position of the second light-shielding pattern may also be similar to that of the first light-shielding pattern as illustrated in FIG. 2, FIG. 5A, FIG. 5B, and FIG. 6, and which may be determined by those having ordinary skilled in the art according to the embodiments described above therefore will not be described herein. Because the first light-shielding pattern and the second light-shielding pattern are respectively disposed on the first substrate and the second substrate, the first light-shielding pattern and the second light-shielding pattern can always block a part of the light regardless of which side the light comes from. Thus, the program in the conventional technique is further prevented.

As described above, a light-shielding pattern is disposed on the substrate, and a portion of the sidewall of the light-shielding pattern is substantially aligned with a portion of the sidewall of the substrate. Thus, when the present invention is applied to LCD panels with ultra slim borders, the LCD panels can always be successfully separated thanks to the partial shading function of the light-shielding pattern even if the photo-curable sealing material shifts or overflows onto the scribe lines.

In summary, a LCD panel in an embodiment of the present invention has at least following advantages:

1. in the LCD panel, a portion of the sidewall of a light-shielding pattern is substantially aligned with a portion of the sidewall of a substrate in accordance with the scribe lines, and the partial shading effect of the light-shielding pattern ensures that a part of the photo-curable sealing material is not fully cured after an illumination process, so that the LCD panel can be successfully separated after the scribing and splitting process.

2. even if the photo-curable sealing material overflows onto the scribe lines after the two substrates are bonded together due to the ultra slim border design of the LCD panel, the problem of unsatisfactory sections can still be avoided through the partial shading function of the light-shielding pattern. Thus, the ultra slim border design can be realized and the production yield can be improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. A liquid crystal display (LCD) panel, comprising:
a first substrate;
a second substrate;
a liquid crystal layer disposed between the first substrate and the second substrate;

a photo-curable sealant disposed between the first substrate and the second substrate, wherein the photo-curable sealant surrounds and is in contact with the liquid crystal layer;

a first light-shielding pattern disposed on the first substrate, wherein a portion of a sidewall of the first light-shielding pattern is substantially aligned with a portion of a sidewall of the first substrate, and the first light-shielding pattern is only overlapped with an outer edge of the photo-curable sealant or is not overlapped with the photo-curable sealant; and a second light-shielding pattern disposed on the second substrate, wherein the second light-shielding pattern is only overlapped with the outer edge of the photo-curable sealant or is not overlapped with the photo-curable sealant, wherein a portion of a sidewall of the photo-curable sealant is substantially aligned with a portion of a sidewall of the second substrate when the second light-shielding pattern is only overlapped with the outer edge of the photo-curable sealant.

2. The LCD panel according to claim 1, wherein the first substrate is an active device array substrate, and the second substrate is an opposite substrate.

3. The LCD panel according to claim 1, wherein the first substrate is an opposite substrate, and the second substrate is an active device array substrate.

4. The LCD panel according to claim 1, wherein a portion of a sidewall of the photo-curable sealant is substantially aligned with a portion of the sidewall of the first substrate when the first light-shielding pattern is only overlapped with the outer edge of the photo-curable sealant.

5. The LCD panel according to claim 1, wherein a portion of a sidewall of the photo-curable sealant is kept at a distance away from a portion of the sidewall of the first substrate when the first light-shielding pattern is only overlapped with the outer edge of the photo-curable sealant.

6. The LCD panel according to claim 1, wherein a portion of a sidewall of the photo-curable sealant is kept at a distance away from a portion of the sidewall of the first substrate when the first light-shielding pattern is not overlapped with the photo-curable sealant.

7. The LCD panel according to claim 1, wherein a material of the first light-shielding pattern comprises metal or light-shielding resin.

8. The LCD panel according to claim 1, wherein the first light-shielding pattern comprises two separate strip-shaped light-shielding patterns, and the strip-shaped light-shielding patterns are distributed along two longer sides of the first substrate.

9. The LCD panel according to claim 1, wherein the first light-shielding pattern comprises three strip-shaped light-shielding patterns, and the strip-shaped light-shielding patterns are distributed along two longer sides and one shorter side of the first substrate.

10. The LCD panel according to claim 9, wherein the strip-shaped light-shielding patterns are separated from each other.

11. The LCD panel according to claim 9, wherein the strip-shaped light-shielding patterns are connected with each other.

12. The LCD panel according to claim 1, wherein the first light-shielding pattern comprises a plurality of L-shaped light-shielding patterns, and the L-shaped light-shielding patterns are distributed corresponding to a part of corners of the first substrate.

13. The LCD panel according to claim 1, wherein a width of the first light-shielding pattern is smaller than a width of the photo-curable sealant.

14. The LCD panel according to claim 1, wherein a portion of a sidewall of the photo-curable sealant is kept at a distance away from a portion of a sidewall of the second substrate when the second light-shielding pattern is not overlapped with the photo-curable sealant.

15. The LCD panel according to claim 1, wherein a material of the second light-shielding pattern comprises metal or light-shielding resin.

16. The LCD panel according to claim 1, wherein the second light-shielding pattern comprises two separate strip-shaped light-shielding patterns, and the strip-shaped light-shielding patterns are distributed along two longer sides of the second substrate.

17. The LCD panel according to claim 1, wherein the second light-shielding pattern comprises three strip-shaped light-shielding patterns, and the strip-shaped light-shielding patterns are distributed along two longer sides and one shorter side of the second substrate.

18. The LCD panel according to claim 17, wherein the strip-shaped light-shielding patterns are separated from each other.

19. The LCD panel according to claim 17, wherein the strip-shaped light-shielding patterns are connected with each other.

20. The LCD panel according to claim 1, wherein the second light-shielding pattern comprises a plurality of L-shaped light-shielding patterns, and the L-shaped light-shielding patterns are distributed corresponding to a part of corners of the second substrate.

21. The LCD panel according to claim 1, wherein a width of the second light-shielding pattern is smaller than a width of the photo-curable sealant.

22. A liquid crystal display (LCD) panel, comprising:
a first substrate;
a second substrate;
a liquid crystal layer disposed between the first substrate and the second substrate;
a photo-curable sealant disposed between the first substrate and the second substrate, wherein the photo-curable sealant surrounds and is in contact with the liquid crystal layer;
a first light-shielding pattern disposed on the first substrate, wherein a portion of a sidewall of the first light-shielding pattern is substantially aligned with a portion of a sidewall of the first substrate, and the first light-shielding pattern is only overlapped with an outer edge of the photo-curable sealant or is not overlapped with the photo-curable sealant; and
a second light-shielding pattern disposed on the second substrate, wherein the second light-shielding pattern is only overlapped with the outer edge of the photo-curable sealant or is not overlapped with the photo-curable sealant, wherein a portion of a sidewall of the photo-curable sealant is kept at a distance away from a portion of a sidewall of the second substrate when the second light-shielding pattern is only overlapped with the outer edge of the photo-curable sealant.

* * * * *